United States Patent Office 3,197,409
Patented July 27, 1965

3,197,409
ALKYLENE GLYCOL ESTER REACTION
PRODUCT
Louis de Vries, Richmond, Calif., assignor to California
Research Corporation, San Francisco, Calif., a corporation of Delaware
No Drawing. Filed Mar. 28, 1963, Ser. No. 268,603
6 Claims. (Cl. 252—56)

This invention relates to a novel alkylene glycol ester reaction product. More particularly, the invention is concerned with a new alkylene glycol ester reaction product of a succinic anhydride substituted high molecular weight unsaturated hydrocarbon polymer.

Alkylene glycol compounds are useful as synthetic oils and as additives for lubricating oils having desirable viscosity-temperature characteristics which permit effective lubrication in spite of wide variations in operating temperatures. Certain alkylene glycol compounds are also useful as dispersants for a variety of compositions, such as paints, fuels, lubricants and the like.

It has now been found that a useful new alkylene glycol compound is provided in the alkylene glycol ester reaction product of a maleic adduct of the copolymer of (A) α-olefins of from about 2 to about 20 carbon atoms and (B) polyolefins of from about 5 to about 20 carbon atoms in which the adducted maleic groups are esterified with a glycol selected from the class consisting of alkylene glycols and polyalkylene glycols having alkylene glycol and polyalkylene glycol groups of a molecular weight between about 44 and 30,000 and containing at least one alkylene oxide unit in which each alkylene oxide unit has from 2 to 7 carbon atoms, the molar ratio of glycol to adducted maleic groups being from about 0.25:1 to 2:1, said copolymer having at least 0.25% by weight of adducted maelic groups, a mole ratio of (A) monomer units to (B) monomer units from about 1:1 to about 400:1 and a molecular weight of from about 10,000 to about 1,000,000.

The alkylene glycol ester derivative of this invention possesses valuable dispersing properties in liquid hydrocarbon compositions, such as fuels and lubricants. When added to lubricating oil compositions, the alkylene glycol ester derivative also improves the viscosity-temperature characteristics of the compositions.

The alkylene glycol ester product of this invention may also be described as the ester of an alkylene glycol and a succinic anhydride substituted copolymer containing (A) monomer units having the general formula

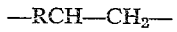

in which R represents hydrogen or an aliphatic essentially hydrocarbon radical of from about 1 to about 18 carbon atoms and mixtures thereof and (B) monomer units having the general formula

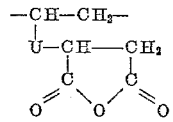

in which U represents an unsaturated aliphatic essentially hydrocarbon radical of from about 2 to about 18 carbon atoms, the ratio of (A) to (B) being from about 1:1 to about 400:1, said copolymer having a molecular weight of from about 10,000 to about 1,000,000, said succinic anhydride groups being esterified with an alkylene glycol as already defined, preferably a member of the class consisting of polyalkylene glycols and alkoxy polyalkylene glycols having polyalkylene glycol groups of a molecular weight between about 220 and 30,000 and containing at least five alkylene oxide units in which each alkylene oxide unit has from 2 to 7 carbon atoms, the molar ratio of glycol to succinic anhydride groups being from about 0.25:1 to 2:1.

The alkylene glycol reacts with the succinic anhydride groups or succinic acid groups to form either monoesters or diesters or mixtures of such derivatives. Using polyalkylene glycol (PG) by way of illustration, the reaction of a substituted succinic anhydride with an alkylene glycol leads first to cleavage of the anhydride and formation of an acid ester, as shown by the formula

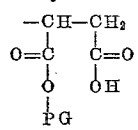

in which PG is $[CH_2CH_2O]_nR$ and R is H, alkyl or acyl. Additional esterification causes elimination of water and formation of the diester.

An alternate synthesis route is the conversion of the anhydride or diacid to lower alkyl esters by reaction with lower alkanols such as methanol. The lower alkyl monoester or diester may then be reacted with alkylene glycol, the lower alkyl group being displaced by the glycol by transesterification, in the presence of a catalyst such as sodium methylate.

The glycol esters will form when the succinic anhydride substituted copolymer and alkylene glycol are mixed together. Heating may be used to accelerate the reaction. Suitable temperatures for this purpose are generally in the range from about 75° C. to about 250° C., preferably from about 90° C. to about 200° C. Conventional esterification catalysts such as paratoluene sulfonic acid are commonly employed.

The reaction of alkylene glycol and succinic anhydride substituted copolymer is conveniently carried out at atmospheric pressures, although vacuum or higher than atmospheric pressures may be used to facilitate water removal or the maintenance of higher temperature. Solvents for the reaction products are conveniently employed to simplify handling of materials and to assist in the control of the reaction conditions. Suitable solvents include the hydrocarbons such as petroleum naphtha fractions and aromatic hydrocarbons.

The alkylene glycol ester reaction products of substituted succinic anhydride copolymers are generally characterized by a mixture of randomly distributed recurring component units having the schematic formula

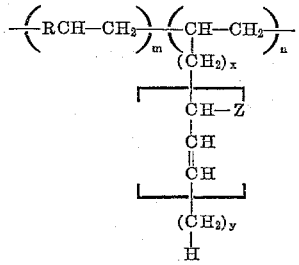

in which Z is an alkylene glycol ester derivative of a succinic acid in which 1 to 2 alkylene glycol ester groups are present, the alkylene glycol portion of said esters being selected from the class consisting of alkylene glycols, polyalkylene glycols, alkoxy alkylene glycols and alkoxy polyalkylene glycols in which the alkylene glycol group has a molecular weight between about 44 and 30,000 and contains at least one alkylene oxide unit and in which each alkylene oxide unit has from 2 to 7 carbon atoms, R is selected from the class consisting of hydrogen and aliphatic hydrocarbon radicals of from about 1 to about 18 carbon atoms, $x$ is a number from 0 to 15 and $y$ is a number from 0 to 15, the total of $x$ and $y$ being from about 0 to 18, the ratio of $m$ to $n$ being from about 1:1 to about 400:1 and preferably from about 10:1 to about 100:1.

In the compounds of the invention as illustrated by the above and other formulae of this application, the double bond in the bracketed portions may occur either between the succinic group and the polymer backbone or between the succinic group and the end of the pendant hydrocarbon side chain.

The maleic adducting agent as shown in the illustrations of this invention is preferably maleic anhydride. However, other known agents may be used, such as maleic acid, monochloromaleic acid, monochloromaleic anhydride, and the like.

A preferred embodiment of the present invention consists of an oil-soluble polymeric dispersant containing a mixture of randomly distributed recurring component units having the formula

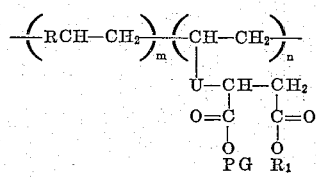

in which U represents an unsaturated aliphatic hydrocarbon radical of from about 4 to about 18 carbon atoms, PG represents a member of the group consisting of polyethylene glycols having a molecular weight of between about 220 and 30,000 and monoalkyl ethers and monoacyl esters thereof, $R_1$ is hydrogen, PG or an aliphatic hydrocarbon radical of from about 1 to about 18 carbon atoms, and R is hydrogen or an aliphatic hydrocarbon radical of from about 4 to about 18 carbon atoms, the ratio of $m$ to $n$ being from about 10:1 to about 100:1.

High molecular weight maleic anhydride adducts or succinic anhydride substituted hydrocarbon polymers useful in the preparation of the alkylene glycol ester reaction products of this invention may be prepared from a variety of materials by several different methods. However, particularly suitable adducts and their preparation are described in detail in my copending application Serial No. 268,604, filed March 28, 1963. Generally described, such adducts are prepared by heating maleic anhydride together with a copolymer of α-olefins and polyolefins having an unsaturated group in the alpha position as already mentioned. In the adduction reaction, the maleic anyhydride adds to the unsaturated hydrocarbon radicals which are pendant from the polymer backbone to give succinic anhydride groups. The temperatures of the adduction are ordinarily between about 100° C. and 300° C., preferably 150° C. and 250° C. The copolymer and maleic anhydride are heated together until the adduction is essentially complete as indicated by no further consumption of maleic anhydride. Usually from about 4 to 24 hours is sufficient. If desired the adduction may be carried out by other techniques, for example, by reaction of a chlorinated polymer containing about 1% by weight of chlorine, with maleic anhydride. Residual chlorine or other nonhydrocarbon substituent does not alter the essentially hydrocarbon character of the polymers as needed for oil solubility. On a weight basis the maleic anhydride adducts preferably contain an average of at least 0.25% of the resulting succinic anhydride groups.

The α-olefins in the copolymers contain at least 2 carbon atoms and include ethylene, 1-butene, 3-methyl-1-butene, 1-tetradecene, 1-octadecene, etc. The polyolefins have at least one terminal double bond and contain at least 5 carbon atoms, preferably at least 8, for example, 1,5-hexadiene, 1,9-octadecadiene, 1,4-octadiene, 1,9,12-octadecatriene, etc. Also included are cyclic olefins, such as cyclohexene, dicyclopentadiene, etc. The preferred copolymers are prepared by reacting the olefin mixtures in the presence of Ziegler-Natta type catalysts which have been found capable of providing satisfactory polymerization of α-olefins. Suitable catalysts and other general background for this type of polymerization reaction are described in a report entitled "Stereospecific Catalysis," beginning at page 93 in the journal "Chemical Engineering" for April 2, 1962 (McGraw-Hill Publishing Co., New York).

The catalytic polymerization reaction employed in the preparation of the polymers is an addition type polymerization. The exact mechanism is still not known, but it is generally thought that stereospecific catalysts provide controlled propagation of the polymer chain from the monomers. This controlled propagation in the case of the present α-olefin monomer mixture results in a linear hydrocarbon chain having randomly mixed alkyl and alkenyl substituents on alternate carbon atoms as already discussed. For present purposes, the catalyst ordinarily involves the combination of a reducing metal compound with a reducible metal compound.

In the preparation of the copolymers from which the maleic anhydride adducts of the present invention are prepared, the preferred reducing compounds are aluminum compounds of the following formulae

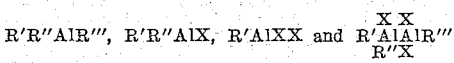

in which the three hydrocarbon radicals, R′, R″ and R‴ which may be the same or different, contain from 1 to 10 carbon atoms each and X's are halogens or mixtures thereof. Illustrative compounds are trimethyl aluminum, triphenyl aluminum, tribenzyl aluminum, phenyldiethyl aluminum, etc. The trialkyl aluminums having 2 to 6 carbon atoms in each alkyl group are most preferred from the standpoint of suitability and availability. The reducible metal compounds of the co-catalyst system used in the preparation of the copolymers is typically a metal of groups IV to VIII of the periodic system of elements, such as titanium, zirconium, vanadium, chromium, molybdenum, etc. Suitable compounds of such metals are the halides, the oxyhalides, the alcoholates, the carboxylic acid salts as illustrated by titanium tetrachloride, vanadium, oxychloride, chromium acetate, etc. The halide compounds are preferred, for example, titanium tetrachloride as well as the complex reaction product containing 3 moles of titanium trichloride to 1 mole of aluminum chloride.

The copolymerization is conveniently carried out at temperatures of from about 30° C. to about 150° C. at atmospheric pressure. The lower temperatures give copolymers of higher molecular weight. A hydrocarbon diluent, such as toluene, xylene, petroleum naphtha or mineral lubricating oil, is commonly employed. The diluent may also serve to some extent as a temperature control under reflux conditions. The reaction time is ordinarily from about 0.5 to 10 hours. When the polymerization reaction is completed to the desired extent, the reaction is stopped by quenching with an alcohol, such as isopropyl alcohol, thus deactivating the polymerization catalyst and incidentally precipitating the copolymer product from the inert hydrocarbon diluent. The copolymers as already mentioned are linear hydrocarbon chains having mixed alkyl and alkenyl substituents on alternate carbon atoms. They have molecular weights of at least about 10,000, preferably from about 50,000 to about 1,000,000 as determined by viscosity measurements and/or standard light scattering methods.

For present purposes, the preferred maleic anhydride adducts are derived from copolymers of cracked wax olefin mixtures of (A) α-olefins of from about 6 to about 20 carbon atoms and (B) diolefins of from about 6 to about 20 carbon atoms. Such cracked wax olefin copolymers are described in detail in my copending application Serial No. 248,212, filed December 31, 1962. The adducts of these copolymers have outstanding properties as lubricating oil additives and are useful in the preparation of still other superior additives for lubricants.

The cracked wax olefin mixtures are suitably prepared by thermal cracking of conventional refined paraffin waxes derived from typical waxy crude oils. Such waxes ordinarily consist of about 90% by weight of normal paraffins containing from about 16 to about 35 carbon atoms. The balance of the wax composition is made up of isoparaffins, naphthenes and small proportions of aromatic hydrocarbons. Thermal cracking which is preferred since it produces high proportions of α-olefins is conveniently carried out by charging the paraffin wax to a reaction zone, such as a hot tube, usually at temperatures of about 500° C. to about 600° C. A few seconds per pass is usually sufficient. Conversions of about 30 to 35% per pass are ordinarily obtained. Atmospheric conditions are preferred, but either pressure or vacuum may be employed if desirable. Diluents such as steam may also be used in the cracking procedure.

The products from the cracking reaction include hydrogen, methane and other hydrocarbons containing as high as 35 carbon atoms. They are effectively separated by conventional means, such as fractional distillation. The lower boiling portion of the products including hydrocarbons of five or fewer carbon atoms may be used as a fuel or in gasoline blending. The portion containing hydrocarbons of more than 20 carbon atoms, if desired, may be recycled for further cracking. The $C_6$ to $C_{20}$ portion may be further fractioned into particular hydrocarbons having carbon contents of $C_{6-7}$, $C_{7-9}$, $C_{9-11}$, $C_{11-15}$, $C_{15-20}$ and the like.

Other paraffin wax charge stocks, cracking conditions and separation procedures of the above-mentioned types are found in descriptions in various publications. The description in U.S. Patent No. 2,172,228 on "Process for the Manufacture of Olefins" is illustrative.

The analysis of a typical cracked wax olefin mixture indicates the following distribution of products:

| | Percent |
|---|---|
| Straight chain α-olefins | 89 |
| Straight chain α,ω-diolefins | 5 |
| Straight chain α-internal polyolefins | 1 |
| Branched-chain and naphthenic hydrocarbons | 3 |
| Conjugated internal diolefins, etc. | 2 |

As mentioned above, the polyalkylene glycols which form the ester of maleic adduct in accordance with this invention contain at least one alkylene oxide unit of from 2 to 7 carbon atoms and have a molecular weight between about 44 and 30,000. For present purposes, the poly-1,2-alkylene glycols of molecular weights above 220 and alkyl ethers thereof are preferred. Such glycols are suitably obtained by polymerizing 1,2-alkylene oxides or mixtures thereof in the presence of a catalyst and an initiator for the reaction, such as water, monohydric alcohol in the case of alkyl ethers, mercaptans, and the like. The preparation of polyglycol compounds of this type has been fully described in U.S. Patents Nos. 2,448,664 and 2,457,139, for example, and requires no detailed discussion here.

For present purposes, the most satisfactory polyalkylene glycols are those derived from ethylene oxide or from 1,2-propylene oxide or mixtures thereof and their alkyl ethers of 1 to 18 carbon atoms per alkyl group which have molecular weights or average molecular weights between about 220 and 30,000, preferably between about 400 and 10,000.

The following polyalkylene glycol ester groups containing from 2 to 7 carbon atoms in each alkylene group are illustrative of the type described above:

—O—$(CH_2$—$CH_2$—$O)$—$OC_2H_5$
—O—$(CH_2$—$CH_2$—$O)_7$—$CH_2CH_2N(C_2H_5)_2$

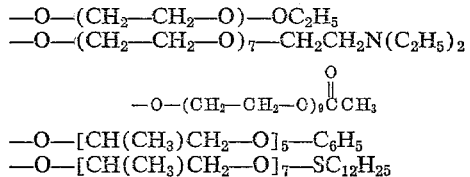

—O—[CH($CH_3$)$CH_2$—O]$_5$—$C_6H_5$
—O—[CH($CH_3$)$CH_2$—O]$_7$—$SC_{12}H_{25}$
—O—[$CH_2$—$CH_2$—O—CH($CH_3$)$CH_2$—O]$_5$—H
—O—($CH_2$—$CH_2$—O)$_9CH_3$
—O—($CH_2$—$CH_2$—O)$_{13}$—$C_8H_{17}$
—O—($CH_2$—$CH_2$—O)$_{13}$—$CH_{12}H_{25}$
—O—($CH_2$—$CH_2$—O)$_{13}$—$C_{18}H_{37}$
—O—[$CH_2$—($CH_3$)CHO]$_{30}$H
—O—($CH_2$—$CH_2$—$CH_2$O)$_{40}$H
—O—$C_5H_{10}OH$
—O—$(C_2H_4OH)_2$

Esters of polyethylene glycol mixtures having average molecular weights of 220, 400, 1000, 1540, 2000 or 10,000 and monoalkyl ethers thereof.

Esters of poly-1,2-propylene glycol mixtures having average molecular weights of 425, 1025 or 10,000 and monoalkyl ethers thereof.

In the ultimate alkylene glycol ester reaction product, satisfactory oil solubility and detergency are generally obtained when the alkylene glycol portion constitutes at least about 0.1 weight percent, preferably from about 4 to 50 weight percent, of the reaction product. Other polar groups, such as aminoalkylene groups, in addition to the polyalkylene glycol may be present in amounts up to about 10% by weight, if desired, to provide supplementary characteristics.

Further illustrations of the preparation of the alkylene glycol ester reaction products of this invention are given in the following examples. The proportions are on a weight basis unless otherwise specified.

EXAMPLE 1

The preparation of maleic anhydride adduct of a Zeigler-Natta polymer of a mixture of cracked wax olefins is carried out. The olefins contain from 11 to 15 carbon atoms each. The mixture contains approximately 90% α-olefins and 6% polyolefins having at least one terminal double bond. The polymer has a molecular weight of about 300,000. 500 g. of the polymer is dissolved in 1200 g. cetane and heated for 20 hours at 420–440° F. with 4 g. of bis(dibutylhydroxyphenyl) methane and 140 g. maleic anhydride. After cooling down, the product is precipitated twice with acetone and twice with methylethylketone yielding a product having a viscosity at 210° F. of 70.4 (2.8% in 150 Neutral oil) and a viscosity index of 139. The anhydride equivalent as determined by the intensity of the infrared absorption band at 1760 cm.$^{-1}$ is 4100. This corresponds to an approximate ratio of pendant alkyl groups to pendant alkenyl succinic anhydride of about 22:1 in the adduct. The "anhydride equivalent" is the number of grams of polymer which combine with 98 g. of maleic anhydride.

EXAMPLE 2

125 g. of a maleic anhydride adduct (4100 equivalent weight) prepared as above is dissolved in 1000 g. of light petroleum naphtha solvent. After adding 105 g. methoxy triglycol and 2.5 g. paratoluene sulfonic acid, the mixture is heated 8 hours at 340° F. After cooling, the reaction product is stirred 2 hours with 40 g. of finely powdered calcium carbonate, then filtered and stripped. 2.5% of the polymer in 150 Neutral oil has a viscosity of 66.4 SSU at 210° F. and a viscosity index of 142.

The chemical and physical characteristics of a variety of alkylene glycol ester products which are prepared in accordance with the above examples illustrative of the invention are summarized in the following Table I. The viscosity index and piston varnish rating are obtained on the basis of typical lubricant compositions employing the given amount of additive in 150 Neutral oil. The base lubricating oil also contains a small amount of about 15 mM./kg. zinc butyl hexyl dithiophosphate, a conventional oxidation inhibitor. The base oil without alkylene glycol ester product has a piston varnish rating of 3.5.

The piston varnish ratings of the lubricant compositions are obtained by the standard FL-2 test procedure as set out in the June 21, 1948, report of the Coordinating Research Council. In this test the lubricants are run in a 6-cylinder Chevrolet engine, using a low-grade gasoline especially prone to cause engine deposits. At the end of each test the engine is dismantled and the detergency or deposition properties of the lubricant compositions are determined by examining the engine deposits on the piston and visually rating them as to the amount of piston varnish present. The piston varnish ratings of the compositions are given in numerical terms on a scale of 0-10 with "10" representing the complete absence of deposits.

In both of the following tables, the characteristic alkylene glycol ester radicals on the pendant alkenyl succinic anhydride groups are identified with reference to the following schematic formula:

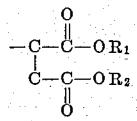

In the examples of Table I, the maleic anhydride adduct of a cracked wax olefin copolymer is used to typify the polymer-maleic adduct starting material. The polymer is prepared from a mixture of cracked wax olefins containing approximately 90% α-olefins and 6% polyolefins having from about 11 to 15 carbon atoms each. Such polymers have a molecular weight of approximately 300,000. Other copolymers are shown in Table II.

In the lubricating oil compositions of this invention, the polyethylene glycol ester product is used with lubricating oil base in amounts sufficient to raise the viscosity index and/or improve the detergency of the base lubricating oil. Ordinarily, amounts of polyethylene glycol ester product of from about 0.1% to about 15% by weight are satisfactory for both of these purposes. In view of the excellent solubility characteristics of the polyethylene glycol ester products, a further feature of the invention lies in the preparation of lubricating oil concentrates containing higher percentages of polyethylene glycol ester products up to about 75%.

The base oil in the lubricant composition of the invention is any oil of lubricating viscosity. Thus, the base oil can be a refined paraffin-type base oil, a refined naphthenic-type base oil, or a synthetic hydrocarbon or synthetic nonhydrocarbon oil of lubricating viscosity. As synthetic oils, suitable examples include oils obtained by polymerization of lower molecular weight alkylene oxides, such as propylene oxide and/or ethylene oxide employing alcohol or acid initiators, such as lauryl alcohol or acetic acid. Still other synthetic oils include esters, e.g., di-(2-ethylhexyl)-sebacate, tricresylphosphate and silicate esters, such as tetra-(2-ethylhexyl)-orthosilicate and hexa-(2-ethylbutoxy)-disiloxane. For present purposes the mineral lubricating oils are preferred, since they show the greatest viscosity and stability improvement.

Lubricant compositions within the scope of the present invention may also contain still other additives of conventional types, such as pour point depressants, oiliness

*Table I*

| Ex. No. | Anhydride Equivalent | $R_1$ | $R_2$ | Amt., percent by Wt. | V.I. | P.V. |
|---|---|---|---|---|---|---|
| 3 | 5,800 | Methoxy polyethylene glycol (350 M.W.). | Methoxy polyethylene glycol (350 M.W.). | 2.5 | | 9.0 |
| 4 | 5,800 | Methyl | Methoxy polyethylene glycol (750 M.W.). | 2.5 | | 9.7 |
| 5 | 5,100 | do | Methyl | 2.8 | 136 | |
| 6 | 7,800 | do | do | 2.8 | 136 | |
| 7 | 7,800 | Ethyl | Ethyl | 2.8 | 135 | |
| 8 | 5,900 | $C_{12}$ | $C_{12}$ | 2.8 | 135 | |
| 9 | 5,900 | Methoxy polyethylene glycol (164 M.W.). | Methoxy polyethylene glycol (164 M.W.). | 2.8 | 140 | |
| 10 | | Methoxy polyethylene glycol (350 M.W.). | Methoxy polyethylene glycol (350 M.W.). | 2.8 | 139 | |
| 11 | 5,400 | Methoxy polyethylene glycol (550 M.W.). | Methoxy polyethylene glycol (550 M.W.). | 2.8 | 145 | |
| 12 | 5,900 | Methoxy polypropylene glycol (600 M.W.). | Methoxy polypropylene glycol (600 M.W.). | 2.8 | 139 | |
| 13 | 5,900 | Methoxy polyethylene glycol (750 M.W.). | Methoxy polyethylene glycol (750 M.W.). | 2.8 | (¹) | |
| 14 | 5,100 | Butyl carbitol | Butyl carbitol | 2.8 | 139 | |
| 15 | 5,100 | Methyl Cellosolve | Methyl Cellosolve | 2.8 | 137.5 | |
| 16 | 7,800 | Hexyl | Methoxy polyethylene glycol (550 M.W.). | 2.8 | | |
| 17 | 7,800 | Butyl | do | 2.8 | 138 | |
| 18 | 7,800 | Methyl | do | 2.8 | 137 | |
| 19 | 3,000 | do | Methoxy polyethylene glycol (350 M.W.). | 2.8 | 144 | |
| 20 | 4,000 | do | do | 2.8 | 139 | |
| 21 | 4,000 | do | Methoxy polyethylene glycol (750 M.W.). | 2.8 | 137 | |

¹ Insoluble in oil.
M.W.=molecular weight.
P.V.=piston varnish.
V.I.=viscosity index.

As shown by the above characteristics, the alkylene glycol ester reaction products of the invention when added to hydrocarbon compositions, such as mineral lubricating oils, provide excellent viscosity-temperature properties. They are also remarkably effective as dispersants for the prevention of harmful engine deposits as indicated by the improvement in piston varnish rating.

The polyethylene glycol ester products of this invention are oil soluble. This is intended to mean that they are soluble in conventional mineral lubricating oils and other oil compositions such as fuels in a concentration of polyethylene glycol ester product of at least about 0.1% by weight based on the total composition.

and extreme pressure agents, anti-oxidants, dyes, blooming agents and the like.

Illustrative lubricant compositions of the aforementioned types containing additives other than the polymeric additive may include, for example, from about 0.1 to about 10% by weight of alkaline earth metal, higher alkyl phenate detergent and wear reducing agents such as the calcium alkylphenate having mixed alkyl groups of 12 to 15 carbon atoms. They may also include from about 0.1 to 10% by weight of organic thiophosphate corrosion and high-temperature oxidation inhibitors, such as the reaction product of pinene and $P_2S_5$, the reaction product of polybutene and $P_2S_5$, and the bivalent metal dihydrocarbon dithiophosphates, zinc butyl amyl dithiophosphate and zinc di-(tetradecylphenyl) dithiophosphate. Metal salt detergents in amounts from about 0.1 to 10% which may also be used are the calcium petroleum sulfonates of the oil-soluble mahogany type and the calcium naphthenates.

Additional examples of alkylene glycol ester reaction products in accordance with the invention are set out in the following table.

mixtures thereof and (B) monomer units having the general formula

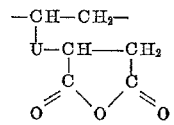

in which U represents an unsaturated aliphatic hydrocarbon radical of from about 2 to about 18 carbon

Table II

| Ex. No. | Copolymer of Monomers | Monomer Ratio | Adducting Agent | Anhydride Equivalent | Adduct Ratio | Mol. Wt. | $R_1$ | $R_2$ |
|---|---|---|---|---|---|---|---|---|
| 22 | Ethylene/propylene/1,7-octadiene. | 25/25/1 | Maleic anhydride. |  | 70/1 | 150,000 | Methoxy polyethylene glycol (425 M.W.). | Methyl. |
| 23 | Dodecene/1,9-octadecadiene. | 1/1 | ___do___ |  | 4/1 | 700,000 | Polyethylene glycol (750 M.W.) | Do. |
| 24 | Dodecene/1,9,12-octadecatriene. | 1/1 | ___do___ |  | 10/1 | 50,000 | Octadecoxypolyethylene glycol (220 M.W.). | Butyl. |
| 25 | Propene/1-butene/1,6-octadiene. | 175/175/1 | ___do___ |  | 400/1 | 100,000 | Poly-1,2-heptylene glycol (25,000 M.W.). | Poly-1,2-heptylene glycol (25,000 M.W.). |
| 26 | Cracked wax olefins ($C_{11}$–$C_{15}$). | 92% α-olefin 4% olefin. | Chloromaleic anhydride. | 2,500 |  | 350,000 | Methoxy polyethylene glycol (350 M.W.). | Methoxy polyethylene glycol (350 M.W.). |
| 27 | Dodecene/1,9-octadecadiene. | 1/1 | Maleic anhydride. |  | 4/1 | 50,000 | Ethylene glycol. | Methyl. |

As indicated above, other maleic adducting agents may be used in place of maleic anhydride. The following example illustrates the method of preparing maleic adduct using chloromaleic acid.

EXAMPLE 28

60 g. of cracked wax olefin polymer as in Example 1 is dissolved in 150 g. of cetane and heated for 18 hours at 430° F. in the presence of 0.5 g. of bis(dibutylhydroxyphenyl)methane and 15 g. of chloromaleic anhydride. The reaction product is cooled under nitrogen, then precipitated four times with dry acetone, then dissolved in benzene. The reaction products show a very strong absorption band at 1760 cm.$^{-1}$ in the infrared spectroscope (this band corresponds to an anhydride group). The percent oxygen (by neutron oxidation analysis) is 1.91%, indicating an anhydride equivalent of 2510.

As already mentioned, the high molecular weight alkylene glycol ester products of this invention are useful in hydrocarbon fuels. In general, hydrocarbon base fuels customarily contain components such as cracked stocks which have a tendency to be unstable and thus form gum and deposits which clog filters and lines in fuel systems. Furnace oils, kerosenes, diesel fuel oils and jet fuels in particular contain substantial amounts of cracked gas oil stocks and form objectionable deposits during normal storage and operating conditions. The gum and deposit-forming tendencies of all such hydrocarbon base fuels are substantially eliminated by the addition of alkylene glycol ester reaction product.

I claim:

1. An oil-soluble polymeric dispersant consisting of the ester of an alkylene glycol and a succinic anhydride substituted copolymer of (A) monomer units having the general formula

—RCH—CH$_2$— in which R represents a member selected from the group consisting of hydrogen and an aliphatic hydrocarbon radical of from about 1 to about 18 carbon atoms and atoms, the ratio of (A) to (B) being from about 1:1 to about 400:1, said copolymer having a moleuclar weight of from about 10,000 to about 1,000,000, said succinic anhydride groups being esterified with a glycol of the class consisting of polyalkylene glycols and alkoxy polyalkylene glycols having polyalkylene glycol groups of a molecular weight between about 220 and 30,000 and containing at least five alkylene oxide units in which each alkylene oxide unit has from 2 to 7 carbon atoms, the molar ratio of glycol to succinic anhydride being from about 0.25:1 to 2:1.

2. A lubricating oil composition comprising a major proportion of an oil of lubricating viscosity and a minor proportion sufficient to improve the detergent characteristics of the polyalkylene glycol ester reaction product of claim 1.

3. An oil-soluble polymeric dispersant in accordance with claim 1 in which the glycol is polyethylene glycol.

4. An oil-soluble polymeric dispersant in accordance with claim 1 in which the glycol is methoxy polyethylene glycol wherein the polyethylene glycol group has a molecular weight of about 750.

5. A lubricating oil composition comprising a major proportion of mineral lubricating oil and a minor proportion sufficient to improve the detergent characteristics of the polyalkylene glycol ester reaction product of claim 3.

6. A lubricating oil composition comprising a major proportion of mineral lubricating oil and a minor proportion sufficient to improve the detergent characteristics of the polyalkylene glycol ester reaction product of claim 4.

References Cited in the file of this patent

UNITED STATES PATENTS 2,892,818   6/59   Lowe et al. _____ 252—56
2,922,987   1/60   Fields _____ 252—56
2,977,334   3/61   Zopf et al. _____ 252—56

OTHER REFERENCES

Noller: Chemistry of Carbon Compounds (1951), W. B. Saunders Co., Philadelphia, Pa.

DANIEL E. WYMAN, *Primary Examiner.*